US009862481B2

(12) United States Patent
Drouin, Jr. et al.

(10) Patent No.: US 9,862,481 B2
(45) Date of Patent: Jan. 9, 2018

(54) SYSTEMS AND METHODS FOR PROTECTING A VEHICLE FROM A DIRECTED ENERGY ATTACK

(71) Applicant: The Boeing Company, Huntington Beach, CA (US)

(72) Inventors: Donald V. Drouin, Jr., O'Fallon, IL (US); Mark J. Clemen, Jr., Southworth, WA (US)

(73) Assignee: The Boeing Company, Chicago, IL (US)

( * ) Notice: Subject to any disclaimer, the term of this patent is extended or adjusted under 35 U.S.C. 154(b) by 168 days.

(21) Appl. No.: 14/923,677

(22) Filed: Oct. 27, 2015

(65) Prior Publication Data

US 2017/0113785 A1    Apr. 27, 2017

(51) Int. Cl.
*B64C 13/16* (2006.01)
*G05D 1/10* (2006.01)
*F41H 13/00* (2006.01)
*F41H 11/02* (2006.01)

(52) U.S. Cl.
CPC .............. *B64C 13/16* (2013.01); *F41H 11/02* (2013.01); *F41H 13/00* (2013.01); *G05D 1/101* (2013.01)

(58) Field of Classification Search
CPC ......... B64C 13/16; B64D 45/02; A61F 9/022; F41H 11/02; F41H 13/00; G01S 7/495; G01S 7/4804; G01B 11/14; G05D 1/0088
See application file for complete search history.

(56) References Cited

U.S. PATENT DOCUMENTS

| | | | |
|---|---|---|---|
| 6,366,594 B1 | 4/2002 | Bauer et al. | |
| 6,606,339 B1 | 8/2003 | Greninger | |
| 6,678,288 B2 | 1/2004 | Rice | |
| 6,687,279 B2 | 2/2004 | Ullman et al. | |
| 7,023,895 B2 | 4/2006 | Ullman et al. | |
| 7,058,100 B2 | 6/2006 | Vetrovec et al. | |
| 7,158,554 B2 | 1/2007 | Ullman et al. | |
| 7,532,652 B2 | 5/2009 | Vetrovec | |
| 7,978,313 B2 | 7/2011 | Guthrie | |
| 8,023,542 B2 | 9/2011 | Vetrovec | |
| 8,675,186 B2 | 3/2014 | Guthrie | |
| 8,791,836 B2 * | 7/2014 | Herman | G08G 1/00 340/901 |
| 9,063,387 B1 | 6/2015 | Hunt et al. | |
| 2004/0135716 A1 * | 7/2004 | Wootton | G01S 7/495 342/13 |
| 2005/0077424 A1 * | 4/2005 | Schneider | F41G 7/303 244/3.11 |
| 2005/0150371 A1 * | 7/2005 | Rickard | F41H 3/00 89/1.11 |
| 2013/0105670 A1 * | 5/2013 | Borosak | B60Q 1/143 250/214.1 |
| 2016/0209266 A1 * | 7/2016 | McNeish | G01J 1/4257 |

\* cited by examiner

*Primary Examiner* — Abby Y Lin
(74) *Attorney, Agent, or Firm* — Armstrong Teasdale LLP

(57) ABSTRACT

A computer-implemented method for protecting a vehicle from a directed energy attack is provided. The method includes receiving, at the vehicle, a beam of directed energy, determining a threat level of the beam of directed energy, and causing the vehicle to automatically execute at least one evasive maneuver when the threat level of the beam of directed energy is greater than a predetermined threshold.

20 Claims, 4 Drawing Sheets

SYSTEMS AND METHODS FOR PROTECTING A VEHICLE FROM A DIRECTED ENERGY ATTACK

BACKGROUND

The field of the present disclosure relates generally to self-defense systems for a vehicle and, more specifically, to systems and methods for maneuvering a vehicle to protect itself from a directed energy attack.

At least some known directed energy weapons, such as high-energy laser weapons and high-power microwave weapons, are becoming an increasingly prominent threat to aircraft. More specifically, directed energy weapons are capable of channeling a large amount of stored energy towards a target at the speed of light. As such, different avoidance techniques for directed energy weapons are typically implemented when compared to avoidance techniques implemented for traditional projectile-type weapons. For example, the aircraft may be manufactured with paints or coatings, or may be manufactured from heavy and robust materials such that the aircraft is capable of withstanding a directed energy attack for an increased amount of time. However, modifying the construction of the aircraft may increase its overall weight, thereby reducing the fuel efficiency of the aircraft. Moreover, the pilot of an aircraft under directed energy attack can sometimes manually maneuver the aircraft to reduce the intensity of the directed energy received at the aircraft. However, in such a scenario, an amount of damage to the aircraft is directly dependent on the reaction time of and types of maneuvers selected by the pilot of the aircraft.

BRIEF DESCRIPTION

In one aspect, a computer-implemented method for protecting a vehicle from a directed energy attack is provided. The method includes receiving, at the vehicle, a beam of directed energy, determining a threat level of the beam of directed energy, and causing the vehicle to automatically execute at least one evasive maneuver when the threat level of the beam of directed energy is greater than a predetermined threshold.

In another aspect, an aircraft is provided. The aircraft includes a sensor that determines at least one of the intensity of a beam of directed energy received at the aircraft and a position of the aircraft relative to a source of the beam of directed energy, and a computing device coupled in communication with said sensor. The computing device determines a threat level of the beam of directed energy, and causes the aircraft to automatically execute at least one evasive maneuver when the threat level of the beam of directed energy is greater than a predetermined threshold.

In yet another aspect, a non-transitory computer-readable storage device having computer-executable instructions embodied thereon for use in operating a vehicle that receives a beam of directed energy is provided. When executed by a computing device, the computer-executable instructions cause the computing device to determine a threat level of the beam of directed energy, and cause the vehicle to automatically execute at least one evasive maneuver when the threat level of the beam of directed energy is greater than a predetermined threshold.

DETAILED DESCRIPTION

The implementations described herein relate to systems and methods of protecting a vehicle, such as an aircraft, from a directed energy attack. More specifically, the systems and methods described herein determine the threat level of a beam of directed energy received at the vehicle, and cause the vehicle to automatically execute one or more evasive maneuvers to facilitate reducing damage to the vehicle. Moreover, the type of evasive maneuver in which to execute is automatically selected based at least partially on the threat level of the beam of directed energy received at the aircraft, and a determination of the most viable avoidance options available for the vehicle. As such, the systems and methods described herein determine and execute efficient means of reducing the intensity of a beam of energy received at the vehicle while reducing the burden on an operator of the vehicle.

Figure 1:
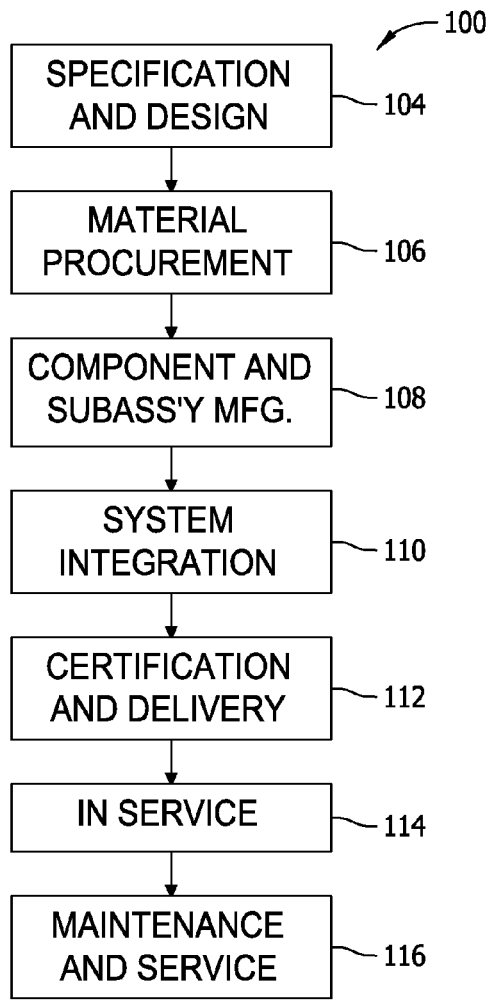
FIG. 1 is a flow diagram of an exemplary aircraft production and service method.
Figure 2:
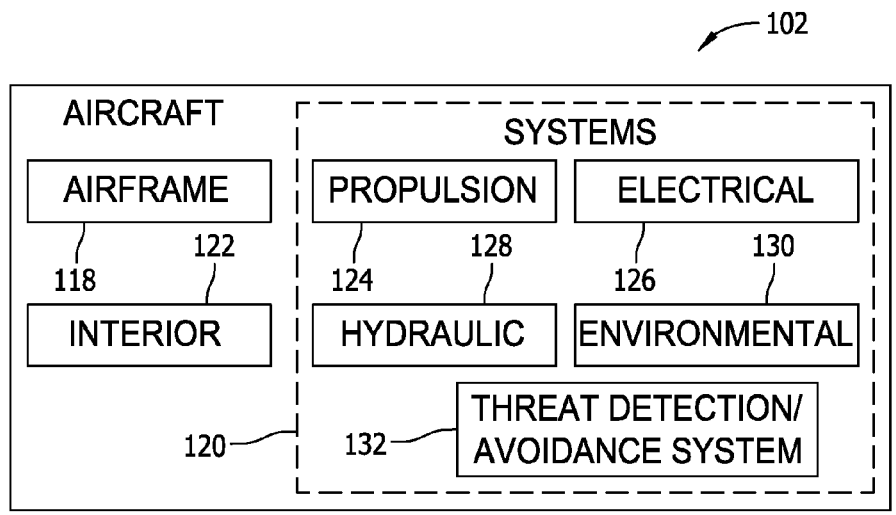
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented on platforms other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, an environmental system 130, and/or a threat detection/avoidance system 132. Threat detection/avoidance system 132 may be embodied as one or more sensors for detecting a threat received at aircraft 102, and a computing device for analyzing the threat and determining avoidance techniques for aircraft 102, as will be described in more detail below. Any number of other systems may be included.

Apparatus and methods embodied herein may be employed during any one or more of the stages of method 100. For example, components or subassemblies corresponding to component and subassembly production process 108 may be fabricated or manufactured in a manner similar to components or subassemblies produced while aircraft 102 is in service 114. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Moreover, it should be understood that, although an aerospace example is shown, the principles of the disclosure may be applied to other structures, such as a maritime structure or an automotive structure.

Figure 3:
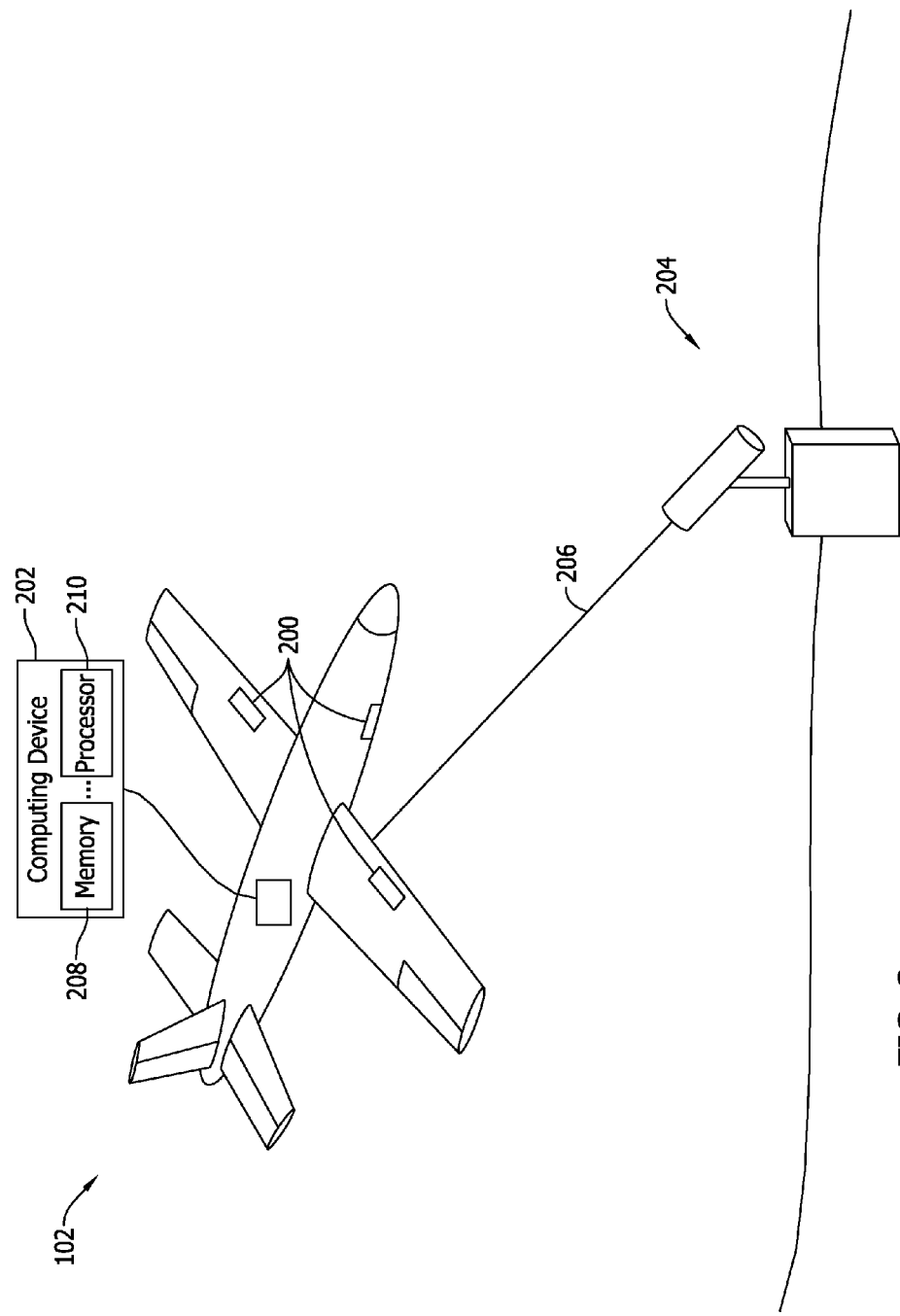
FIG. 3 is an illustration of an exemplary aircraft under a directed energy attack.

FIG. 3 is an illustration of aircraft 102 under a directed energy attack. In the exemplary implementation, aircraft 102 includes at least one sensor 200 and a computing device 202 coupled in communication with sensor 200 onboard aircraft 102. Also shown in FIG. 3 is a directed energy weapon 204 (i.e., a source of directed energy) that discharges a beam 206 of directed energy towards aircraft 102. As will be described in more detail below, computing device 202 is also coupled in communication with systems 120 (shown in FIG. 2) of aircraft 102 such that computing device 202 is capable of causing aircraft 102 to automatically execute at least one evasive maneuver to protect itself when beam 206 of directed energy is received at aircraft 102.

Sensor 200 may be any device capable of at least one of determining the intensity of beam 206 of directed energy received at aircraft 102, and determining a position of aircraft 102 relative to directed energy weapon 204. Exemplary sensors include, but are not limited to, laser light sensors, microwave energy sensors, acoustic sensors, particle beam sensors, plasma sensors, thermistors, photodiode sensors, phototransistor sensors, electric field sensors, radio-frequency sensors, and heat sensors. In implementations where sensor 200 is embodied as a photodiode sensor, a phototransistor sensor, or an electric field sensor, for example, sensor 200 is capable of determining the energy amplitude of beam 206 of directed energy to determine the intensity. Moreover, in implementations where sensor 200 is embodied as a heat sensor, sensor 200 is capable of determining heat fluctuations along outer portions of aircraft 102 to determine the intensity of beam 206 of directed energy. Any combination of different sensors may be used that enables aircraft 102 to function as described herein, and multiple sensors may be positioned along outer portions of aircraft 102.

Computing device 202 includes a memory 208 and a processor 210, comprising hardware and software, coupled to memory 208 for executing programmed instructions. Processor 210 may include one or more processing units (e.g., in a multi-core configuration) and/or include a cryptographic accelerator (not shown). Computing device 202 is programmable to perform one or more operations described herein by programming memory 208 and/or processor 210. For example, processor 210 may be programmed by encoding an operation as executable instructions and providing the executable instructions in memory 208.

Processor 210 may include, but is not limited to, a general purpose central processing unit (CPU), a microcontroller, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 210, cause processor 210 to perform at least a portion of the functions described herein. The above examples are exemplary only, and thus are not intended to limit in any way the definition and/or meaning of the term processor.

Memory 208 is one or more devices that enable information such as executable instructions and/or other data to be stored and retrieved. Memory 208 may include one or more computer-readable media, such as, without limitation, dynamic random access memory (DRAM), synchronous dynamic random access memory (SDRAM), static random access memory (SRAM), a solid state disk, and/or a hard disk. Memory 208 may be configured to store, without limitation, executable instructions, operating systems, applications, resources, installation scripts and/or any other type of data suitable for use with the methods and systems described herein.

Instructions for operating systems and applications are located in a functional form on non-transitory memory 208 for execution by processor 210 to perform one or more of the processes described herein. These instructions in the different implementations may be embodied on different physical or tangible computer-readable media, such as memory 208 or another memory, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. The computer-readable media may be selectively insertable and/or removable from computing device 202 to permit access and/or execution by processor 210. In an alternative implementation, the computer-readable media is not removable.

In operation, when beam 206 of directed energy is received at aircraft 102, computing device 202 analyzes data received from sensor 200 to determine a threat level of beam 206 of directed energy. For example, when determining the threat level, computing device 202 at least one of a) determines a position of the source of beam 206 of directed energy, b) determines the intensity of beam 206 of directed energy, c) determines an expected total power flux from the source of beam 206 of directed energy over a planned flight path for aircraft 102, and d) determines a maximum expected threat level from the source of beam 206 of directed energy over the planned flight path.

After determining the threat level of beam 206 of directed energy, computing device 202 alerts the pilot of aircraft 102 of the current threat level, and also causes aircraft 102 to automatically execute at least one evasive maneuver when the threat level of beam 206 of directed energy is greater than a predetermined threshold. More specifically, computing device 202 selects which evasive maneuver to execute based at least partially on how much the threat level is greater than the predetermined threshold. For example, evasive maneuvers are executed when the current threat level is greater than the predetermined threshold, and evasive maneuvers may be executed when an extrapolated threat level at future waypoints along the current flight path of aircraft 102 is determined to be greater than the predetermined threshold. Computing device 202 continually assesses the threat level of beam 206 of directed energy as aircraft 102 travels along its flight path, such that appropriate evasive maneuvers to be executed can be determined. An exemplary assessment of different threat levels determined by computing device 202 is shown in Table I:

TABLE I

| Threat Type | Threat Level | Temperature Change | Bandwidth |
| --- | --- | --- | --- |
| None | 0 | None | |
| Sunshine | 1 | Negligible | Broad |
| Tracking Laser | 2 | Negligible | Narrow |
| Dazzling Laser | 3 | Negligible | Any |
| Sensor Blinding | 4 | Small | Any |
| Heating (level 1) | 5 | Moderate: less than 100° F. | Any |
| Heating (level 2) | 6 | 100° F. to 200° F. | Any |
| Puncturing | 7 | Greater than 200° F. | Any |

As shown in Table I, in one implementation, the threat level is determined as a function of a temperature change detected at outer portions of aircraft 102. Moreover, the predetermined threshold corresponds to Threat Level 4 and computing device 202 causes aircraft 102 to automatically execute evasive maneuvers when the determined threat level is greater than Threat Level 4. In an alternative implementation, the threat level is determined as a function of any quantifiable parameter that enables the systems and methods to function as described here.

As described above, computing device 202 selects which evasive maneuver to execute based at least partially on how much the threat level is greater than the predetermined threshold. For example, at a first threat level greater than the predetermined threshold, such as Threat Level 5 computing device 202 determines a first evasive maneuver for the first threat level for modifying an orientation of aircraft 102 relative to the source of beam 206 of directed energy, without modifying the general flight path of aircraft 102. As such, beam 206 of directed energy is received on less vulnerable portions of aircraft 102. For example, the orientation of aircraft 102 may be modified randomly to facilitate reducing excess heating at portions of aircraft 102 that receive beam 206 of directed energy, or the orientation of aircraft 102 may be modified such that beam 206 of directed energy is received at less sensitive or non-critical components of aircraft 102. More specifically, vulnerable portions of aircraft 102 include, but are not limited to, areas near the pilot of aircraft 102 or other areas housing people, or critical systems of aircraft 102, such as the flight cabin, windows, plastic structures, thin/lightweight skin areas, unshielded electronics, the engines, the wings, and flight control surfaces (e.g., flaps, ailerons, and vertical stabilizers). Moreover, as the threat level continues to increase to greater levels above the predetermined threshold, the orientation of aircraft 102 may be modified by a greater magnitude in one or more of the pitch, roll, and yaw axes of aircraft 102 than at the lower threat levels.

Figure 4:
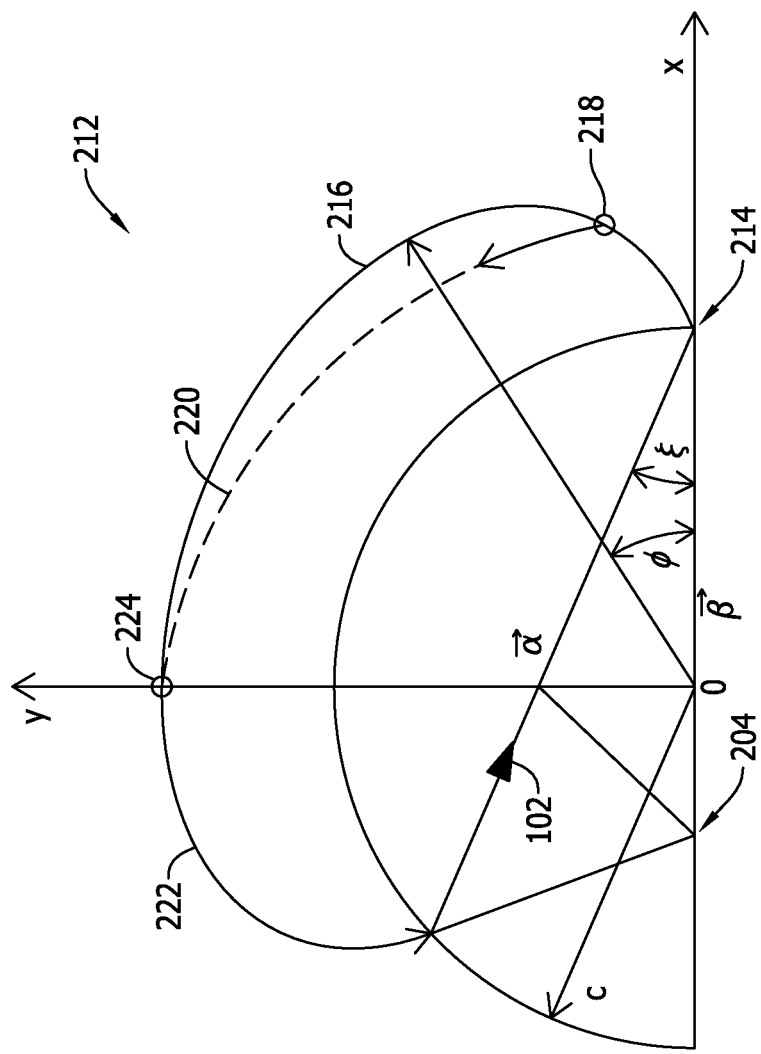
FIG. 4 is a diagram of an exemplary flight path that may be executed by the aircraft shown in FIG. 3.
Figure 5:
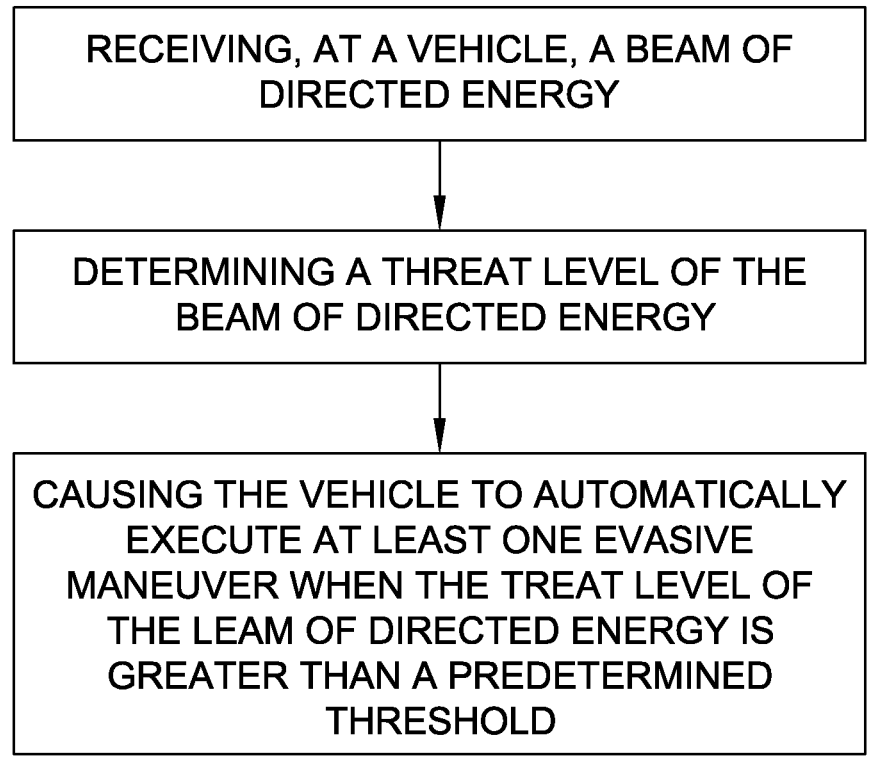
FIG. 5 is a flow diagram illustrating an exemplary method for protecting a vehicle from a directed energy attack.

FIG. 4 is a diagram of an exemplary flight path 212 that may be executed by aircraft 102 (shown in FIG. 3). In the exemplary implementation, aircraft 102 travels along a flight trajectory generally defined by vector αThe source of directed energy (i.e., directed energy weapon 204) is positioned along the x-axis, and beam 206 of directed energy is discharged towards aircraft 102 along a trajectory defined by vector βVector β intersects with vector α at an attack point 214, and an angle ξ is defined therebetween. Angle φ is the angle between the x-axis and a vector extending from the origin O in a standard coordinate system towards a location of aircraft 102 along a flight path when the source of the threat is located at the origin O.

As described above, in operation, computing device 202 (shown in FIG. 3) determines the threat level of beam 206 of directed energy, and causes aircraft 102 to automatically execute at least one evasive maneuver. More specifically, in the exemplary implementation, computing device 202 determines a second threat level greater than the predetermined threshold, and determines a second evasive maneuver 216 for reducing the intensity of beam 206 of directed energy received at aircraft 102. For example, second evasive maneuver 216 is for modifying the trajectory of aircraft 102 such that a distance between aircraft 102 and the source of beam 206 of directed energy is increased. As such, in accordance with the inverse-square law, the intensity of beam 206 of directed energy is inversely proportional to the square of the distance of aircraft 102 from the source of beam 206 of directed energy.

In one embodiment, computing device 202 determines second evasive maneuver 216 using an algorithm for increasing the distance between aircraft 102 and the source of beam 206 of directed energy, and for approaching the source of beam 206 of directed energy from a different direction. The algorithm for determining the trajectory of aircraft 102 executing second evasive maneuver 216 along the x and y axes shown in FIG. 4 are:

$$x1(\phi) = [c1 + b(\phi)]\cos(\phi) - b(\phi)\cos\left[\frac{c1+b(\phi)}{b(\phi)}\phi\right]; \text{ and}$$

$$y1(\phi) = [c1 + b(\phi)]\sin(\phi) - b(\phi)\sin\left[\frac{c1+b(\phi)}{b(\phi)}\phi\right], \text{ wherein}$$

$$c1 = \frac{|\alpha|}{2\cos\xi} = \frac{\vec{\alpha}\cdot\vec{\beta}}{2|\beta|};$$

$$\cos\xi = \frac{\vec{\alpha}\cdot\vec{\beta}}{2|\alpha||\beta|}; \text{ and}$$

$$b(\phi) = \frac{[180° - 2\xi]}{360°}c1.$$

Moreover, as described above, computing device 202 continually assesses the threat level of beam 206 of directed energy as aircraft 102 travels along its flight path. In the exemplary implementation, computing device 202 continually assesses the threat level of beam 206 of directed energy when the flight path of aircraft 102 is modified, and travels along a flight path in accordance with second evasive maneuver 216. As such, when the threat level at a first waypoint 218 along second evasive maneuver is less than the predetermined threshold, a course correction is implemented in the form of a third evasive maneuver 220 for modifying the trajectory of aircraft 102. In one implementation, and as will be described in more detail below, third evasive maneuver 220 facilitates directing aircraft 102 towards the start of an approach vector 222 at a second waypoint 224 more efficiently than if aircraft 102 were to continue on the trajectory of second evasive maneuver 216. More specifically, third evasive maneuver 220 modifies the trajectory of aircraft 102 such the distance between aircraft 102 and the source of the beam of directed energy is increased at a lesser rate than second evasive maneuver 216 when the threat level of the beam of directed energy is less than the second threat level. The algorithm for determining the trajectory of aircraft 102 executing third evasive maneuver 220 along the x and y axes shown in FIG. 4 are:

$$x2(\varphi)=[c2]\cos(\varphi); \text{ and}$$

$$y2(\varphi)=[c2]\sin(\varphi),$$

wherein c2 is the distance between aircraft 102 and a target (i.e., the source of directed energy or directed energy weapon 204). The process of determining course corrections for aircraft 102 may be executed more than once as aircraft approaches second waypoint 224.

Sensors 200 (shown in FIG. 3) are also capable of maintaining a situational awareness of the environment surrounding aircraft 102. In one implementation, computing device 202 uses data received from sensors 200 related to the environment surrounding aircraft 102 to determine the position of a foreign object (not shown) relative to aircraft 102. If the foreign object is capable of shielding aircraft 102 from beam 206 of directed energy, computing device 202 determines an evasive maneuver for positioning the foreign object between aircraft 102 and the source of beam 206 of directed energy when the foreign object is closer to aircraft 102 than a safe distance for aircraft 102 from the source of beam 206 of directed energy. Exemplary foreign objects include, but are not limited to, man-made structures and natural terrain. In an alternative implementation, the situational awareness may be used to determine other viable avoidance options, such as decreasing the altitude of aircraft 102.

At second waypoint 224, computing device 202 determines an approach vector 222 for aircraft 102 towards the source of beam 206 of directed energy and, in one implementation, causes aircraft 102 to automatically execute approach vector 222 after executing either second or third evasive maneuvers 216 and 220. More specifically, approach vector 222 facilitates positioning aircraft 102 for attacking the source of beam 206 of directed energy, while also enabling aircraft 102 to efficiently return to its original flight trajectory along vector α

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for protecting a vehicle from a directed energy attack, said method comprising:
   receiving, at the vehicle, a beam of directed energy;
   determining a threat level of the beam of directed energy; and causing the vehicle to automatically execute at least one of a plurality of evasive maneuvers, when the threat level of the beam of directed energy is greater than a predetermined threshold, wherein the at least one evasive maneuver is selected based at least partially on how much the threat level is greater than the predetermined threshold.

2. The method in accordance with claim 1, wherein determining a threat level comprises:
   determining a first threat level greater than the predetermined threshold; and
   determining a first evasive maneuver for the first threat level for modifying an orientation of the vehicle relative to a source of the beam of directed energy such that the beam of directed energy is received on less vulnerable portions of the vehicle.

3. The method in accordance with claim 2, wherein determining a threat level comprises:
   determining a second threat level greater than the first threat level; and
   determining a second evasive maneuver for reducing an intensity of the beam of directed energy received at the vehicle.

4. The method in accordance with claim 3, wherein determining a second evasive maneuver comprises determining the second evasive maneuver for modifying a trajectory of the vehicle such that a distance between the vehicle and a source of the beam of directed energy is increased.

5. The method in accordance with claim 4 further comprising:
   determining the threat level of the beam of directed energy as the trajectory of the vehicle is modified; and
   determining a third evasive maneuver for modifying the trajectory of the vehicle such that the distance between the vehicle and the source of the beam of directed energy is increased at a lesser rate than the second evasive maneuver when the threat level of the beam of directed energy is less than the second threat level.

6. The method in accordance with claim 3, wherein determining a second evasive maneuver comprises:
   determining a position of a foreign object relative to the vehicle, wherein the foreign object is capable of shielding the vehicle from the beam of directed energy; and
   determining the second evasive maneuver for positioning the foreign object between the vehicle and a source of the beam of directed energy when the foreign object is closer to the vehicle than a safe distance from the source of the beam of directed energy.

7. The method in accordance with claim 3 further comprising:
   determining an approach vector for the vehicle towards a source of the beam of directed energy; and
   causing the vehicle to automatically execute the approach vector after executing the second evasive maneuver.

8. The method in accordance with claim 1, wherein determining a threat level comprises determining the threat level as a function of a temperature change detected at outer portions of the vehicle.

9. An aircraft comprising:
   a sensor that determines at least one of an intensity of a beam of directed energy received at the aircraft and a position of the aircraft relative to a source of the beam of directed energy; and
   a computing device coupled in communication with said sensor, wherein said computing device is configured to:
      determine a threat level of the beam of directed energy; and
      cause the aircraft to automatically execute at least one of a plurality of evasive maneuvers, when the threat level of the beam of directed energy is greater than a predetermined threshold, wherein the at least one evasive maneuver is selected from the plurality of evasive maneuvers based at least partially on how much the threat level is greater than the predetermined threshold.

10. The aircraft in accordance with claim 9, wherein said computing device is further configured to:
determine a first threat level greater than the predetermined threshold; and
determine a first evasive maneuver for the first threat level for modifying an orientation of the aircraft relative to a source of the beam of directed energy such that the beam of directed energy is received on less vulnerable portions of the aircraft.

11. The aircraft in accordance with claim 10, wherein said computing device is further configured to:
determine a second threat level greater than the first threat level; and
determine a second evasive maneuver for reducing an intensity of the beam of directed energy received at the aircraft.

12. The aircraft in accordance with claim 11, wherein said computing device is further configured to determine the second evasive maneuver for modifying a trajectory of the aircraft such that a distance between the aircraft and a source of the beam of directed energy is increased.

13. The aircraft in accordance with claim 12, wherein said computing device is further configured to:
determine the threat level of the beam of directed energy as the trajectory of the aircraft is modified; and
determine a third evasive maneuver for modifying the trajectory of the aircraft such that the distance between the aircraft and the source of the beam of directed energy is increased at a lesser rate than the second evasive maneuver when the threat level of the beam of directed energy is less than the second threat level.

14. The aircraft in accordance with claim 11, wherein said computing device is further configured to:
determine a position of a foreign object relative to the aircraft, wherein the foreign object is capable of shielding the aircraft from the beam of directed energy; and
determine the second evasive maneuver for positioning the foreign object between the aircraft and a source of the beam of directed energy when the foreign object is closer to the aircraft than a safe distance from the source of the beam of directed energy.

15. The aircraft in accordance with claim 11, wherein said computing device is further configured to:
determine an approach vector for the aircraft towards a source of the beam of directed energy; and
cause the aircraft to automatically execute the approach vector after executing the second evasive maneuver.

16. A non-transitory computer-readable storage device having computer-executable instructions embodied thereon for use in operating a vehicle that receives a beam of directed energy, wherein, when executed by a computing device, the computer-executable instructions cause the computing device to:
determine a threat level of the beam of directed energy; and
cause the vehicle to automatically execute at least one of a plurality of evasive maneuvers, when the threat level of the beam of directed energy is greater than a predetermined threshold, wherein the at least one evasive maneuver is selected based at least partially on how much the threat level is greater than the predetermined threshold.

17. The non-transitory computer readable storage device in accordance with claim 16 further comprising computer-executable instructions that cause the computing device to:
determine a first threat level greater than the predetermined threshold; and
determine a first evasive maneuver for the first threat level for modifying an orientation of the vehicle relative to a source of the beam of directed energy such that the beam of directed energy is received on less vulnerable portions of the vehicle.

18. The non-transitory computer readable storage device in accordance with claim 17 further comprising computer-executable instructions that cause the computing device to:
determine a second threat level greater than the first threat level; and
determine a second evasive maneuver for reducing an intensity of the beam of directed energy received at the vehicle.

19. The non-transitory computer readable storage device in accordance with claim 18 further comprising computer-executable instructions that cause the computing device to determine the second evasive maneuver for modifying a trajectory of the vehicle such that a distance between the vehicle and a source of the beam of directed energy is increased.

20. The non-transitory computer readable storage device in accordance with claim 19 further comprising computer-executable instructions that cause the computing device to:
determine the threat level of the beam of directed energy as the trajectory of the vehicle is modified; and
determine a third evasive maneuver for modifying the trajectory of the vehicle such that the distance between the vehicle and the source of the beam of directed energy is increased at a lesser rate than the second evasive maneuver when the threat level of the beam of directed energy is less than the second threat level.

* * * * *

UNITED STATES PATENT AND TRADEMARK OFFICE
CERTIFICATE OF CORRECTION

PATENT NO. : 9,862,481 B2  
APPLICATION NO. : 14/923677  
DATED : January 9, 2018  
INVENTOR(S) : Drouin, Jr. et al.

Page 1 of 1

It is certified that error appears in the above-identified patent and that said Letters Patent is hereby corrected as shown below:

In Column 7, Lines 12-13, delete:
"$x2(\varphi) = [c2] \cos(\varphi)$; and
$y2(\varphi) = [c2] \sin(\varphi)$,"
And insert therefor:
--$x2(\phi) = [c2] \cos(\phi)$; and
$y2(\phi) = [c2] \sin(\phi)$,--

Signed and Sealed this  
First Day of May, 2018

Andrei Iancu  
*Director of the United States Patent and Trademark Office*